United States Patent
Faraj et al.

(10) Patent No.: US 9,806,931 B2
(45) Date of Patent: Oct. 31, 2017

(54) TRANSMISSION METHOD AND SYSTEM USING AN ADAPTIVE AND PROGRAMMABLE HIERARCHICAL MODULATION

(75) Inventors: Zakariya Faraj, Blagnac (FR); Jean-Didier Gayrard, Cugnaux (FR); Fabrice Arnal, Cugnaux (FR)

(73) Assignee: Thales, Courbevoie (FR)

( * ) Notice: Subject to any disclaimer, the term of this patent is extended or adjusted under 35 U.S.C. 154(b) by 1001 days.

(21) Appl. No.: 13/328,589

(22) Filed: Dec. 16, 2011

(65) Prior Publication Data
US 2012/0154532 A1      Jun. 21, 2012

(30) Foreign Application Priority Data
Dec. 17, 2010 (FR) ...................................... 10 04946

(51) Int. Cl.
*H04N 13/00* (2006.01)
*H04L 27/00* (2006.01)
*H04L 27/34* (2006.01)

(52) U.S. Cl.
CPC ................................ *H04L 27/3488* (2013.01)

(58) Field of Classification Search
None
See application file for complete search history.

(56) References Cited

U.S. PATENT DOCUMENTS

| | | | | |
|---|---|---|---|---|
| 5,386,239 A * | 1/1995 | Wang | ..................... | H04N 7/015 348/470 |
| 6,757,264 B1 | 6/2004 | Gayrard | | |
| 7,561,897 B2 * | 7/2009 | Karr | ....................... | G04G 21/04 370/204 |
| 2006/0135061 A1 * | 6/2006 | Ying | ...................... | H01Q 1/243 455/19 |
| 2010/0318882 A1 | 12/2010 | Cantillo et al. | | |
| 2011/0032867 A1 | 2/2011 | Gayrard et al. | | |
| 2011/0032949 A1 | 2/2011 | Cantillo et al. | | |
| 2011/0267229 A1 | 11/2011 | Gayrard et al. | | |
| 2012/0057641 A1 * | 3/2012 | Sadough | ............. | H04L 27/3488 375/242 |

FOREIGN PATENT DOCUMENTS

| | | |
|---|---|---|
| EP | 2207320 A1 | 7/2010 |
| WO | 03024048 A2 | 3/2003 |

OTHER PUBLICATIONS

Seung Hyun Choi et al.: "The Mapping and demapping algorithms for high order modulation of DVB-S2 systems," Communications, 2006 Asia-Pacific Conference on, IEEE, PI, Aug. 1, 2006, pp. 1-5.
Search Report and Written opinion of corresponding French application No. 1004946 dated Jul. 29, 2011.

* cited by examiner

*Primary Examiner* — Kate Luo
(74) *Attorney, Agent, or Firm* — Baker Hostetler LLP (57) ABSTRACT

A method for transmission of a signal simultaneously including a first stream of binary data and one or more other streams of binary data, the method including, in the following order: dynamic distribution of bits of the data streams between coders, with one coder per data stream; coding the distributed bits using the coders; dynamic distribution of the coded bits between hierarchical levels of a modulator; and hierarchical modulation using the modulator.

9 Claims, 6 Drawing Sheets

TRANSMISSION METHOD AND SYSTEM USING AN ADAPTIVE AND PROGRAMMABLE HIERARCHICAL MODULATION

CROSS-REFERENCE TO RELATED APPLICATION

This application claims priority to foreign French patent application No. FR 10 04946, filed on Dec. 17, 2010, the disclosure of which is incorporated by reference in its entirety.

FIELD OF THE DISCLOSED SUBJECT MATTER

The field of the invention is that of the transmission and of the reception of coded digital data, based on a hierarchical modulation.

BACKGROUND

In the case of the transmission systems with variable attenuations of the signal, it is generally desired that the method for transmission of the signal has a high data rate together with a high level of availability over time. Since the data rate is of the form:

spectral efficiency×bandwidth, the idea is therefore to obtain a high spectral efficiency and a high level of availability.

In the case of interactive or point to point services, this problem is solved using adaptive physical layers: the receivers inform the transmitter of the SNR (Signal-to-Noise Ratio), which can adjust, for example, the modulation and coding scheme of the waveform. This solution may not be envisaged in broadcast mode.

In the future satellite broadcast systems, whether this be to mobiles, or to fixed stations in Ka band (20-22 GHz), it is difficult to ensure a high level of availability and a high spectral efficiency owing to the occurrence of severe attenuations within the channel. In the case of mobiles, these attenuations result from masking effects by the mountainous terrain, the buildings, the vegetation; in the case of broadcasting to fixed stations, in the Ka band, they are due to climatic events such as rain.

One known solution is to provide two levels of quality of service:
  a minimal service (HP for High Priority) with a very high level of availability even during the periods of severe attenuations, such as for example a standard definition of the image in the case of video service assured for 99.9% of the year, including during rainy periods and
  a nominal service (LP for Low Priority) during favorable periods such as for example for a mobile in the line of sight of the satellite, or in a clear sky for the Ka band for 99% of the year.

For example, for the broadcasting of HD TV in the Ka band, the minimal TV service is in SD ("Standard Definition"), the nominal service being in HD ("High Definition").

This solution is obtained by using hierarchical modulation. The prior art on hierarchical modulation is typically that of the standards such as DVB-SH (EN 302 583) or DVB-S2 (EN 302 307).

Hierarchical modulation allows two binary streams, labeled high priority (HP) and low priority (LP), to be made to pass within the same transmission channel, the most significant bits (or MSB) of the constellation for the modulation being reserved for the HP stream after coding, and the least significant bits for the LP stream after coding. The rate of coding for each data stream is adjustable, which allows two different operating points for the high priority stream (HP) and for the low priority stream (LP). It is recalled that an operating point is the SNR required for a target Bit Error Rate (or BER).

Figure 1A:
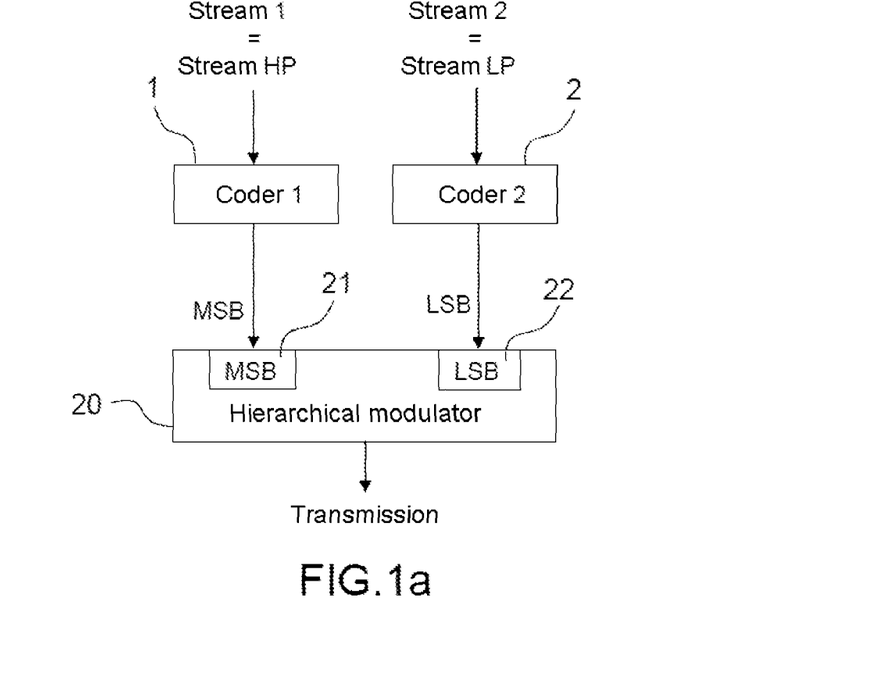
FIGS. 1a and 1b, already described show schematically a transmitter with hierarchical modulator (FIG. 1a) and a receiver with hierarchical demodulator (FIG. 1b) according to the prior art.

By means of a transmitter such as that shown in FIG. 1a, two independent virtual transmission channels are thus created: an HP channel and an LP channel. It comprises a coder 1, 2 for each stream, a hierarchical modulator 20 which comprises means 21 for reserving the most significant bits (or MSB) for the HP stream and means 22 for reserving the least significant bits for the LP stream.

Figure 2A:
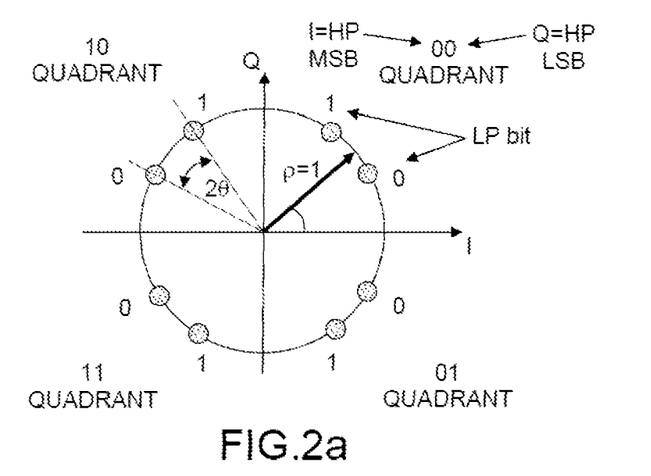
FIGS. 2a-2c are diagrams of hierarchical modulations 8PSK (FIG. 2a), 16-QAM (FIG. 2b) and 64-QAM (FIG. 2c), FIG. 3, already described, illustrates schematically the operating points.
Figure 2B:
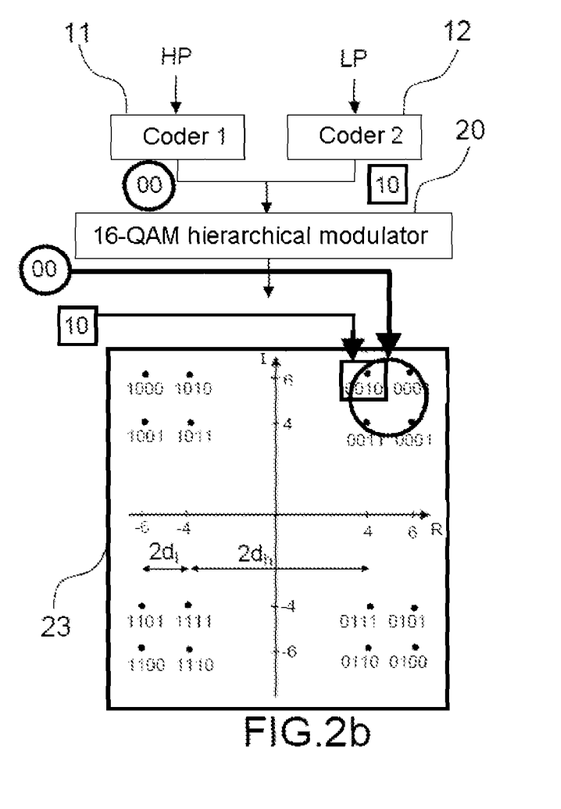
Figure 2C:
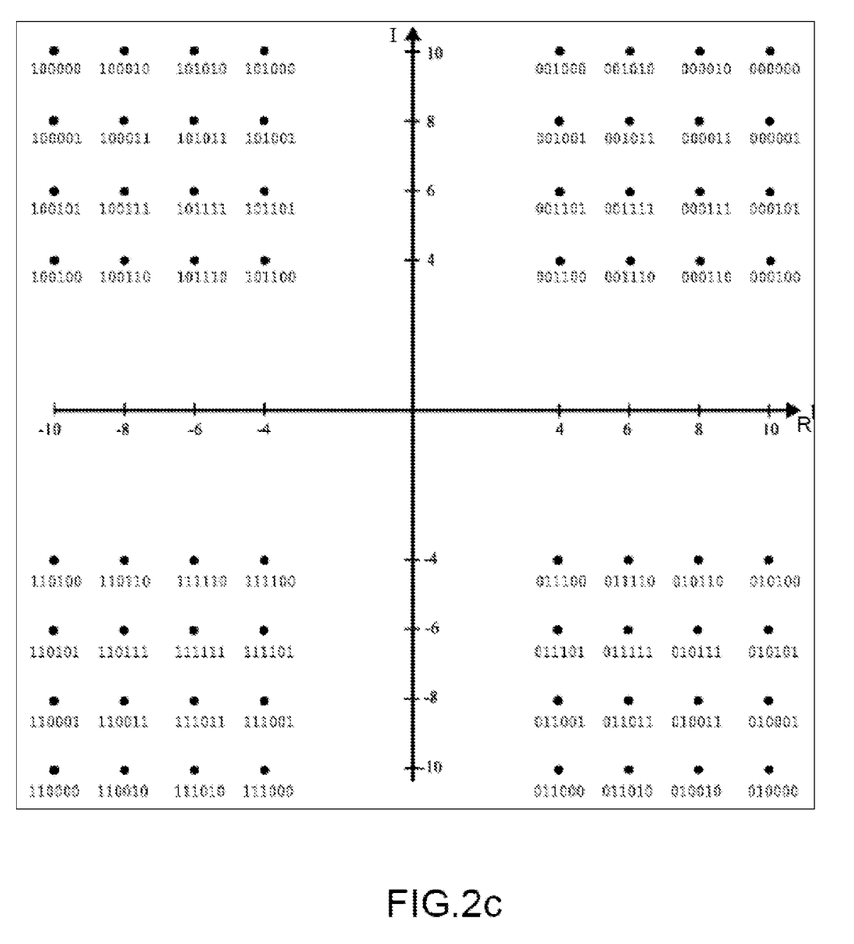

The ratio of the HP and LP rates is fixed by the type of constellation for the modulation. Two examples of constellation diagrams are shown in FIGS. 2a-2c. In the example in FIG. 2a, the hierarchical modulation based on an 8PSK modulation (acronym for the expression "8 Phase Shift Keying", or modulation by phase shifting over 8 possible values of phase), transmits two HP bits and one LP bit for each symbol; the hierarchical modulation based on a 16-QAM modulation (acronym for the expression "16 Quadrature Amplitude Modulation", or quadrature amplitude modulation over 16 states), shown in FIG. 2b, transmits two HP bits and two LP bits for each symbol. In FIG. 2b can also be seen the bits coded 00 coming from the coder 1 and the bits 10 coming from the coder 2 in the diagram of the constellation 23. The ratio of the HP and LP rates is therefore highly constrained.

Figure 1B:
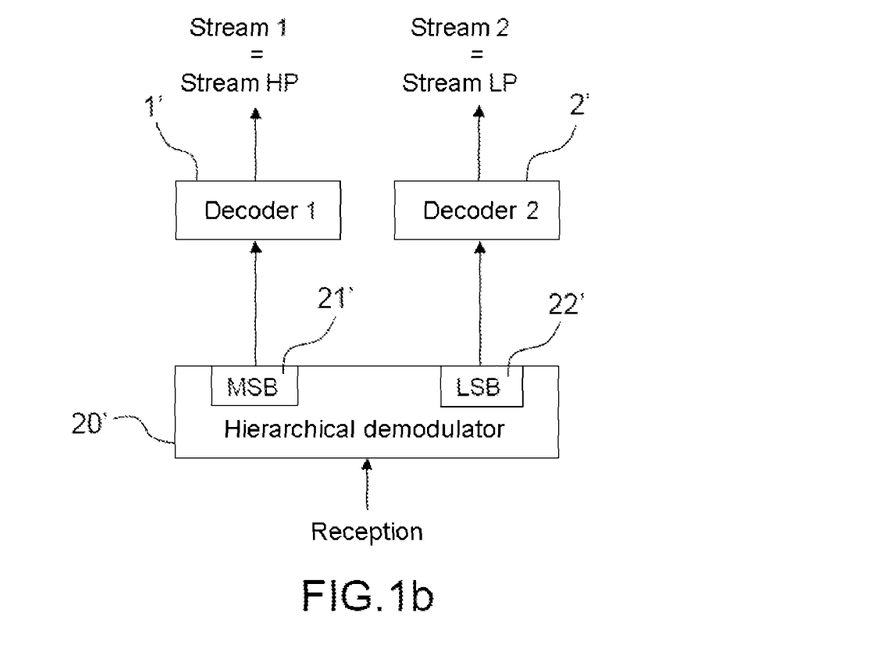

On the receiver side, the basic (HP) stream received can practically always be decoded correctly, but the improved (LP) stream received is only decoded correctly if the conditions are favorable. One conventional design of receiver is shown in FIG. 1b, symmetric case of the transmitter in FIG. 1a. It comprises a hierarchical demodulator 20' with means 21' for allocating the most significant bits (or MSB) to a first stream, and means 22' for allocating the least significant bits to a second stream, two decoders, one 1' for the stream comprising the most significant bits, the other 2' for the stream comprising the least significant bits, which at the output are one the HP stream, the other the LP stream.

Figure 3:
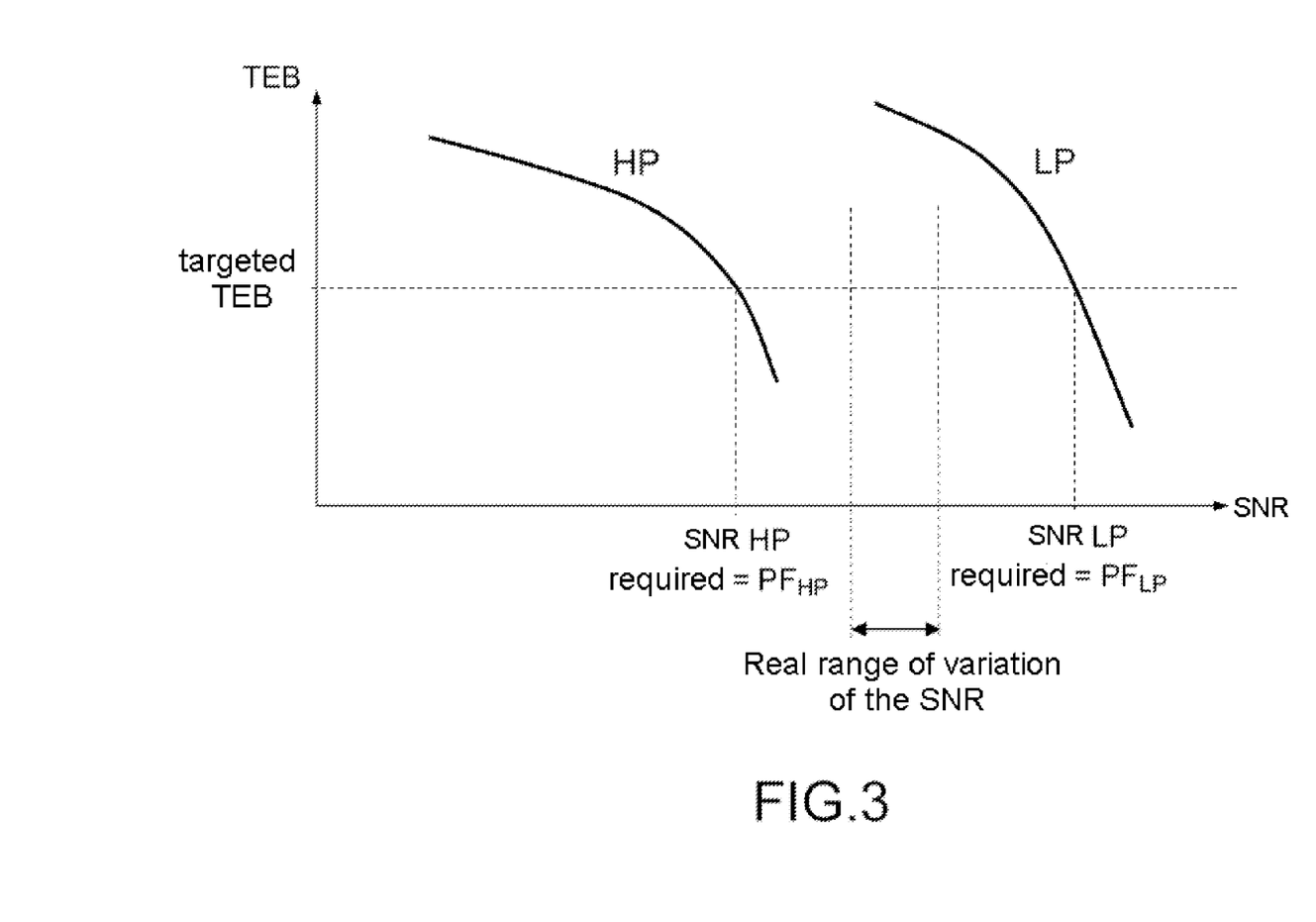

In FIG. 3 are shown examples of curves of Bit Error Rate (BER) as a function of the SNR, one for an HP stream coded with a very robust coding rate (for example ¼), and an LP stream, more capacitive, coded with a higher coding rate (for example ½). Based on a required quality (target BER), the required SNR is determined for each HP stream, in other words the HP and LP operating points denoted $OP_{HP}$ and $OP_{LP}$. It can be seen that, for certain ranges of real variation of the SNR in a given system, such as that in FIG. 3, the SNR is too high with respect to the operating point of the HP stream and too low for the LP stream which will therefore never be decoded: the performance in this type of system is then sub-optimal.

The operating points of the two HP and LP virtual channels are, by construction, higher than the operating points of an equivalent real channel having the same spectral efficiency determined as a function of the coding rate (=number of useful bits/(number of useful bits+number of redundant bits)) and of the chosen modulation. It is then a question of penalty.

The penalties for the HP and LP virtual channels are dependent on the geometrical characteristics of the constellation. These consist of an angle of separation (2θ) of the low priority blips in an 8PSK modulation (see FIG. 2a) and of an amplitude ratio ($\alpha=d_h/d_l$) in the case of the 16-QAM modulation (see FIG. 2b). This parameter allows the HP and LP penalties to be adjusted.

Finally, the ratio of the HP and LP rates, together with the operating points, are fixed and dependent on the coding rate of the coders for the HP and LP streams, and also on the type of the constellation.

The document EP 2 207 320 provides a static improvement for the performance curve of the LP stream (Bit Error rate as a function of the Signal-to-Noise Ratio). A first coder is used for coding the bits of the HP stream as in a conventional hierarchical modulation. In contrast, a second coder is used for coding the bits of the LP streams and a part or all of the HP bits thus allowing a redundancy to be created between the 2 coders in the HP bits. This redundancy is used during the decoding for improving the operating point of the LP stream (this is a fixed improvement of around 0.6 dB for $\alpha=1$). However, this static improvement of the LP stream imposes a rate constraint for the LP stream.

SUMMARY

The aim of the invention is to increase the availability and the spectral efficiency.

More precisely, one subject of the invention is a method for transmission of a signal comprising simultaneously a first stream of binary data and at least one other stream of binary data, characterized in that it comprises in the following order:
  i. a step for dynamic distribution of the bits of the data streams between coders called injection step, with one coder per data stream,
  ii. a step for coding the distributed bits by means of the coders,
  iii. a step for dynamic distribution of the coded bits between hierarchical levels of a modulator, called routing step,
  iv. a step for hierarchical modulation by means of the modulator.

Another subject of the invention is a method for reception of a signal transmitted according to the preceding method, which comprises in the following order:
  a step for hierarchical demodulation by means of a demodulator, with one hierarchical level per data stream, in a reciprocal manner to the modulation,
  a step for dynamic distribution of the demodulated bits between decoders in a reciprocal manner to the routing,
  a step for decoding data streams with one decoding per data stream by means of a decoder, in a reciprocal manner to the coding,
  a step for dynamic distribution of the decoded streams into a first stream and at least one other stream of binary data in a reciprocal manner to the injection.

A method for transmission of a signal is thus obtained that simultaneously comprises a first stream of binary data and at least one other stream of binary data allowing the adaptation of the rates and of the operating points of the various streams thanks notably to an adaptive and programmable hierarchical modulation and demodulation (over time).

According to one feature of the invention, the injection and/or the routing parameters are a function of the nature of the data streams, of their rates and/or of operating points and/or of time.

The first stream of binary data is a high priority stream, and the other stream or streams of binary data is (are) a lower priority stream (lower priority streams).

According to a first embodiment, it comprises a high priority stream and a lower priority stream and, the signal being an HD TV signal which comprises a standard signal and an HD complement, the high priority stream is dedicated to the standard signal, the lower priority stream is dedicated to the HD complement.

According to another embodiment, it comprises a stream with high priority, a stream with medium priority and a stream with low priority, and being a 3D TV signal which comprises a standard signal, an HD complement and a 3D complement, the stream with high priority is dedicated to the standard signal, the stream with medium priority is dedicated to the HD complement, and the stream with low priority is dedicated to the 3D complement.

The invention also relates to a transmitter for a signal comprising simultaneously a first stream of binary data and at least one other stream of binary data, which comprises:
  an injector that dynamically distributes the bits of the data streams between coders, with one coder per data stream,
  the coders that code the distributed bits,
  a router connected to the coders that dynamically distributes the coded bits between hierarchical levels of a hierarchical modulator, with one hierarchical level per data stream,
  a hierarchical modulator for the coded bits, connected to the router.

This transmitter relates for example to two streams and comprises two coders and a hierarchical modulator with two levels.

This transmitter, using an adaptive and programmable hierarchical modulation, allows:
  1) Thanks to the injector, the rates of the high priority (HP) and low priority (LP) binary streams to be dynamically adjusted to the rates of the data streams of the two services: minimal service and nominal service; this quite clearly has an impact on the operating points (SNR: Signal-to-Noise Ratio)
  2) Thanks to the injector and to the router, the penalties for the operating points of the two high priority (HP) and low priority (LP) channels to be dynamically adjusted to the conditions of propagation: operating point of the HP channel in order to correspond to the cases of high attenuations (blanking or rain for example), the operating point of the LP channel in order to correspond to the favorable cases (line-of-sight and clear sky for example).

This transmitter thus allows the various streams to be dynamically adapted in order to respond to the needs of the application, and the virtual channels to be dynamically adapted to the conditions of propagation, and accordingly the availability to be optimized.

Another subject of the invention is a receiver for a signal transmitted by the preceding transmitter, which comprises:
  a. a hierarchical demodulator for the received signal, with one hierarchical level per data stream,
  b. a de-router, connected to the hierarchical demodulator, that dynamically distributes the demodulated bits between decoders in a reciprocal manner to the router in the transmitter,
  c. the decoders for the demodulated bits, with one decoder per data stream,
  d. a de-injector connected to the decoders, that dynamically distributes the decoded bits into a first stream of binary data and one other stream (other streams) of binary data in a reciprocal manner to the injector in the transmitter.

Lastly, another subject of the invention is a system for simultaneous transmission of a first stream of binary data and of at least one other stream of binary data, equipped with a transmitter and with a receiver such as described. This is for example a terrestrial or satellite broadcast system.

BRIEF DESCRIPTION OF THE DRAWINGS

Other features and advantages of the invention will become apparent upon reading the detailed description that follows, presented by way of non-limiting example and with reference to the appended drawings in which.

From one figure to the other, the same elements are identified by the same references.

DETAILED DESCRIPTION

Conventional hierarchical modulation partitions the 2 HP and LP streams in the sense that each of the streams is (prior to the modulation) coded separately from the other and that each coded stream plays the same role during the hierarchical modulation as illustrated in FIG. 1a. All the HP bits are coded by the coder 1, all the LP bits are coded by the coder 2; the coders can be identical but not necessarily. In the hierarchical modulator 20, all the high-priority coded bits (MSB) come from the coder 1, whereas all the lower priority coded bits (LSB) come from the coder 2. This is illustrated in the following example in the form of tables, the first table for the coders where 8 HP bits are coded by the coder 1 and 8 LP bits are coded by the coder 2, the second table for the modulator:

| Bits at the input of the coder 1 | HP | HP | HP | HP | HP | HP | | HP | HP |
|---|---|---|---|---|---|---|---|---|---|
| Bits at the input of the coder 2 | LP | LP | LP | LP | LP | LP | | LP | LP |
| High-priority coded bits | 1 | 1 | 1 | 1 | 1 | 1 | | 1 | 1 |
| Lower priority coded bits | 2 | 2 | 2 | 2 | 2 | 2 | | 2 | 2 |

Figure 4A:
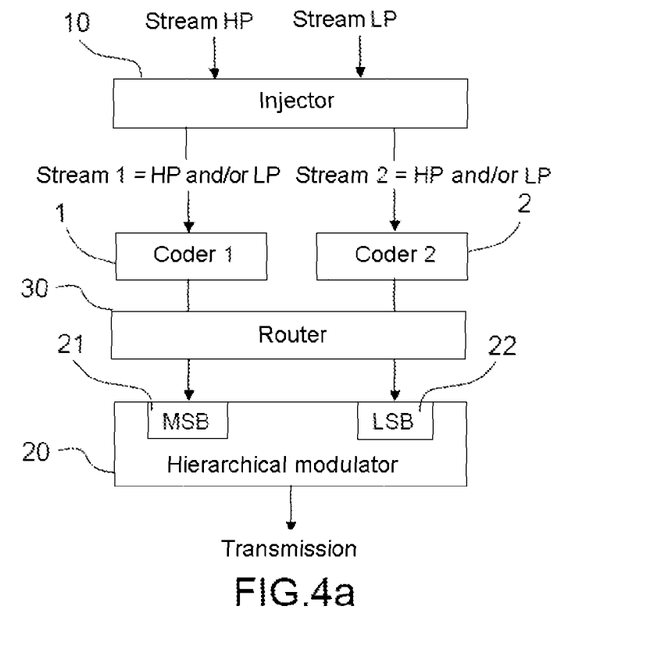
FIGS. 4a and 4b show schematically an example of a transmitter (FIG. 4a) and an example of a receiver (FIG. 4b) with two streams, according to the invention.
Figure 4B:
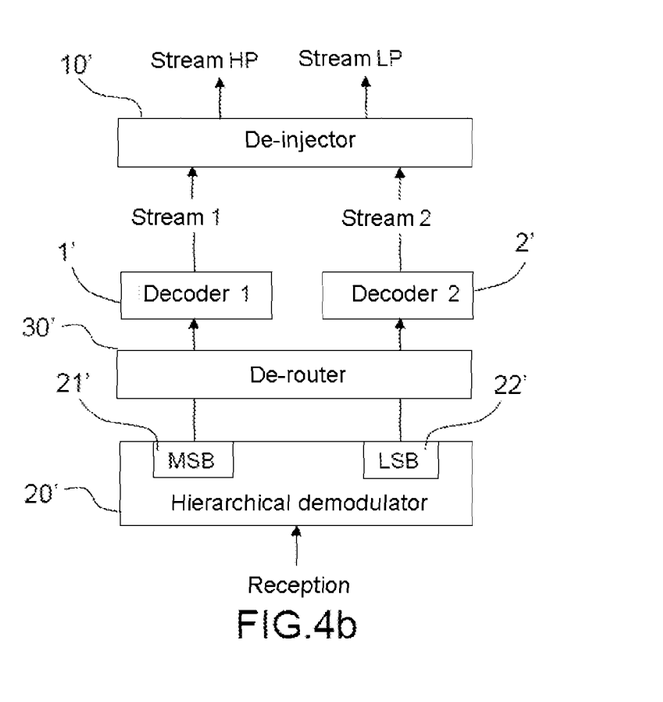

The basic principle of the invention described in relation to FIGS. 4a and 4b provides:

1) the ability to inject, by means of an injector 10, LP bits in place of HP bits before the coder 1 and/or to inject HP bits in place of LP bits before the coder 2, so as to thus be able to adapt the rates to the needs of the application; in the case, for example, of an HD TV broadcast application (in high definition), this means adapting the ratio of the rates of a relatively static sequence, such as the TV news, and that of a full motion sequence, such as a football match, which clearly has an impact on the operating points (SNR: Signal-to-Noise Ratio). The data streams at the input of the injector are thus divided up into an intermediate stream 1 and an intermediate stream 2; more generally, there are as many intermediate streams at the output of the injector as there are streams (N) at the input of the injector.

2) the ability to exchange, by means of a router 30, coded bits from the coder 1 with coded bits from the coder 2 before the hierarchical modulator 20, so as to thus be able to adapt the operating points and hence improve the availability.

The advantage of this solution is two-fold:

1) the ability of the system to dynamically adapt to the rates of the HP and LP streams by varying the parameters of the distribution rule of the injector, 2) the ability of the system to dynamically adapt the operating points of the HP and LP streams by varying the parameters of the distribution rule of the injector and/or of the router.

Three modes of operation are possible: injection without routing, routing without injection, injection with routing. One example will be presented for each of these modes.

The role of the injector 10 is to dynamically distribute the bits of the HP and LP streams between the two coders 1 and 2 according to a predefined rule, known to the transmitter and to the receiver. The following tables illustrate an example of injection without routing in which one LP bit is inserted into the coder 1 one out of 3 times.

| Bits at the input of the coder 1 | HP | HP | LP | HP | HP | LP | | HP | HP |
|---|---|---|---|---|---|---|---|---|---|
| Bits at the input of the coder 2 | LP | LP | LP | LP | LP | LP | | LP | LP |
| High-priority coded bits | 1 | 1 | 1 | 1 | 1 | 1 | | 1 | 1 |
| Lower priority coded bits | 2 | 2 | 2 | 2 | 2 | 2 | | 2 | 2 |

Compared with the distribution of the preceding example, 6 bits from the HP stream are coded (by the coder 1) instead of 8, and 10 bits from the LP stream are coded (by the coders 1 and 2) instead of 8. With regard to the operating points, this does not result in any change for the HP stream whose SNR remains unchanged. In contrast, the bits of the LP stream are not all coded in the same way, since some are coded by the coder 1, and others by the coder 2; the SNR for the LP stream is therefore modified. As this is the case of a mode without routing, the modulator 20 operates as in the preceding example.

The role of the router 30 is to dynamically distribute the coded bits between the hierarchical levels (in this case between high-priority bits and lower priority ones) of the hierarchical modulator 20 according to a predefined rule, known to the transmitter and to the receiver. The following tables illustrate an example of routing without injection, with an alternate routing of the coded bits: a coded bit from the coder 1 becomes lower priority 1 out of 2 times. The result of this is that high-priority coded bits (MSB, acronym for "Most Significant Bit") come from the coder 1 and from the coder 2, and that lower priority coded bits (LSB, acronym for "Least Significant Bit") also come from the coder 1 and from the coder 2, and both in the same proportion. Since this is a mode without injection, the bits at the input of the coders are as in the initial example.

| Bits at the input of the coder 1 | HP | HP | HP | HP | HP | | HP | HP |
|---|---|---|---|---|---|---|---|---|
| Bits at the input of the coder 2 | LP | LP | LP | LP | LP | | LP | LP |
| Coded high-priority bits | 1 | 2 | 1 | 2 | 1 | 2 | | 1 | 2 |
| Coded bits lower priority | 2 | 1 | 2 | 1 | 2 | 1 | | 2 | 1 |

Finally, it is of course possible to combine injection and routing. This is illustrated with the following tables that combine the two preceding examples: injection of an LP bit towards the coder 1 one out of three times and alternate routing of the coded bits.

| | | | | | | | | |
|---|---|---|---|---|---|---|---|---|
| Bits at the input of the coder 1 | HP | HP | LP | HP | HP | LP | HP | HP |
| Bits at the input of the coder 2 | LP | LP | LP | LP | LP | LP | LP | LP |
| Coded high-priority bits | 1 | 2 | 1 | 2 | 1 | 2 | 1 | 2 |
| Coded bits lower priority | 2 | 1 | 2 | 1 | 2 | 1 | 2 | 1 |

The advantage of this solution is two-fold:

1) the ability of the system to dynamically adapt to the rates of the HP and LP streams by varying the parameters of the distribution rule of the injector 10, 2) the ability of the system to dynamically adapt the operating points of the HP and LP streams by varying the parameters of the distribution rule of the injector 10 and/or of the router 30.

These distribution rules are determined in advance; they may be chosen as a function of the rates, of the nature of the streams (high-priority, lower priority) and/or of the operating points and/or of time. They may also be adjusted according to information received by return in the case of interactive applications such as information on measured Binary Error Rates (BER) or on Packet Error Rates (PER).

As is shown in FIG. 4b, on the receiver side, the received signal is demodulated by the hierarchical demodulator 20' by means 21' and 22' according to the two hierarchical levels (in this case MSB and LSB) into two streams which are divided by a de-router 30' into two streams 1 and 2 by applying as a distribution rule the inverse of that of the router 30 in the transmitter. The stream 1 is decoded by the decoder 1', the stream 2 by the decoder 2'. The decoded bits are then divided by a de-injector 10' into two HP and LP streams by applying as a distribution rule the inverse of that of the injector 10 in the transmitter.

This example may typically be applied to an HD TV broadcast signal which comprises a first signal called SD ("Standard Definition") and an HD complement to this first signal in order to reach the HD quality. The HP stream is dedicated to this first signal SD, the LP stream being dedicated to the HD complement.

The preceding examples relate to a signal with two streams (HP and LP) with hence a transmitter with two coders and a hierarchical modulator with two levels (MSB, LSB), and a corresponding receiver.

Figure 5A:
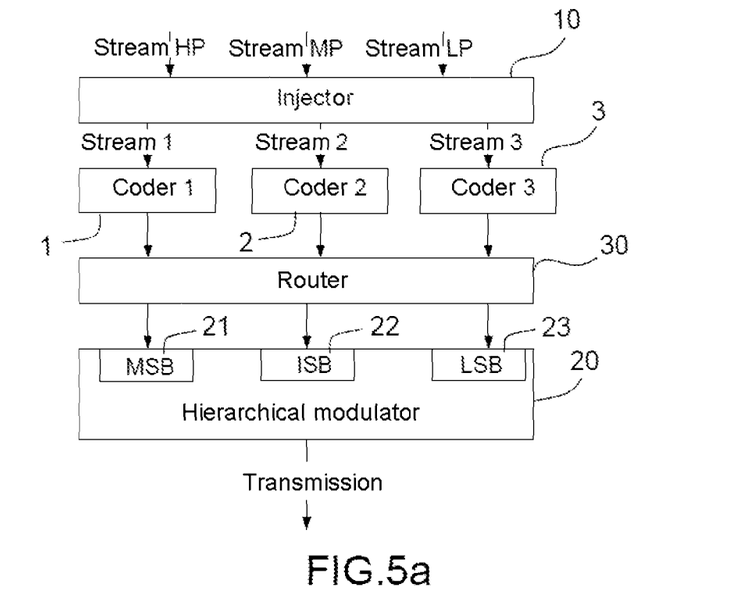
FIGS. 5a and 5b show schematically an example of a transmitter (FIG. 5a) and an example of a receiver (FIG. 5b) with three streams, according to the invention.
Figure 5B:
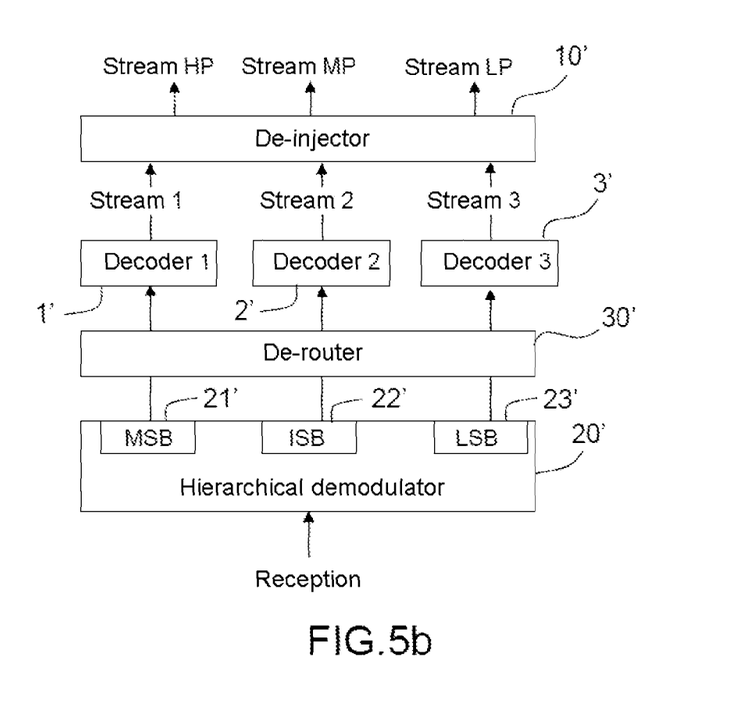

The following example described in relation to FIGS. 5a and 5b is that of a transmission of three binary streams classified by order of priority: HP for High Priority, MP for Medium Priority and LP for Low Priority. In this example, the modulation illustrated is a hierarchical 64-QAM modulation provided in the DVB-T standard and whose constellation is illustrated in FIG. 2c. One symbol of the constellation is represented by 6 bits (ABCDEF). The 2 most significant bits (MSB: AB----), which have the highest priority, correspond to the $1^{st}$ level of the hierarchical modulator, the 2 intermediate bits (ISB: acronym for "Intermediate Significant Bit": --CD--) with intermediate priority correspond to the $2^{nd}$ level and the 2 least significant bits (LSB: ----EF), which have the lowest priority, correspond to the $3^{rd}$ level.

The injector 10 of the corresponding transmitter shown in FIG. 5a dynamically distributes the bits from the HP, MP and LP streams between three coders 1, 2, 3 according to a predefined rule. The router 30 dynamically distributes the coded bits between the three hierarchical levels (in the present case between the bits with highest priority (MSB), with intermediate priority (ISB) and with lowest priority (LSB)) of the hierarchical modulator 20.

Conversely, the signal received by the corresponding receiver shown in FIG. 5b is demodulated by a demodulator 20' according to the three hierarchical levels (in the present case MSB, ISB and LSB) into three streams which are divided by a de-router 30' into three streams 1, 2 and 3 by applying as a distribution rule the inverse of that of the router 30 in the transmitter. The streams 1, 2 and 3 are respectively decoded by three decoders 1', 2', 3'. The decoded bits are then distributed by a de-injector 10' according to three HP, MP and LP streams by applying as a distribution rule the inverse of that of the injector 10 in the transmitter.

This example may typically be applied to a 3D TV broadcast signal which comprises a first signal called SD ("Standard Definition"), a first HD complement to this first signal in order to reach an HD quality, and a second 3D complement to this first complement in order to reach a 3D quality. The HP stream is dedicated to this first SD signal, the MP stream being dedicated to the HD complement, and the LP stream being dedicated to the 3D complement.

More generally, the invention is applicable to a signal with N streams, using a transmitter with N coders and using a hierarchical modulator with N levels and a corresponding receiver.

As indicated in the preamble, these transmitter-receivers are particularly well adapted to satellite broadcast systems whether this be to mobiles or to fixed stations. More generally, they may be used for any given type of transmission of digital signals: for transmissions of RF signals via terrestrial channel (Digital Terrestrial Television for example) or via satellite, transmission via cable, via ADSL, via optical fiber, etc.

We claim:

1. A method for transmission of a signal including simultaneously a first stream of binary data and one or more other streams of binary data, leading to N binary data streams, N being an integer with a minimum value of 2, the method comprising, in the following order:

dynamically injecting some bits of a binary data stream in the N binary data streams that are exchanged with some bits of another binary data stream to dynamically produce N separate binary data streams having some bits exchanged with each other as compared to original bits in the first stream and the one or more other streams of said binary data, N being an integer with a minimum value of 2;

coding the dynamically produced data stream bits of the N separate binary data streams after said injection individually using an N number of coders, respectively, to produce N intermediate streams having coded bits, respectively, N being an integer with a minimum value of 2;

dynamically routing the coded bits of said N intermediate streams between N hierarchical levels of a modulator such that some coded bits of a coder in the N number of coders are exchanged with some coded bits of another coder in the N number of coders prior to said routing; and hierarchically modulating the routed coded bits using the modulator.

2. The method for transmission of a signal according to claim 1, wherein parameters for the dynamic injection of bits of the N separate binary data streams and/or dynamic routing of the coded bits are a function of a nature of the N separate binary data streams, of rates of the N separate binary data streams, of operating points, and/or of time.

3. A method for reception of a signal transmitted by the transmission method according to claim 1, the method of reception comprising, in the following order:

hierarchical demodulation using a demodulator, with N hierarchical levels, in a reciprocal manner to the hierarchically modulating;

dynamic distribution of the demodulated bits between N decoders in a reciprocal manner to the routing;

decoding the distributed demodulated bits using the N decoders, in a reciprocal manner to the coding; and dynamic distribution of the decoded streams into a first stream and one or more other streams of binary data in a reciprocal manner to the injection.

4. The method for reception of a signal according to claim 3, wherein the first stream of binary data is a high priority stream, and the other streams of binary data are lower priority streams.

5. The method for reception of a signal according to claim 4, wherein the signal comprises a high priority stream and a lower priority stream, the signal bears an HD TV signal which comprises a standard signal and an HD complement, the high priority stream is dedicated to the standard signal, and the lower priority stream is dedicated to the HD complement.

6. The method for reception of a signal according to claim 4, wherein the signal comprises a stream with high priority, a stream with medium priority and a stream with low priority, the signal bears a 3D TV signal which comprises a standard signal, an HD complement and a 3D complement, the stream with high priority is dedicated to the standard signal, the stream with medium priority is dedicated to the HD complement, and the stream with low priority is dedicated to the 3D complement.

7. The method for transmission of a signal according to claim 1, wherein the first stream of binary data is a high priority stream, and the other streams of binary data are lower priority streams.

8. The method for transmission of a signal according to claim 7, wherein the signal comprises a high priority stream and a lower priority stream, the signal bears an HD TV signal which comprises a standard signal and an HD complement, the high priority stream is dedicated to the standard signal, and the lower priority stream is dedicated to the HD complement.

9. The method for transmission of a signal according to claim 7, wherein the signal comprises a stream with high priority, a stream with medium priority and a stream with low priority, the signal bears a 3D TV signal which comprises a standard signal, an HD complement and a 3D complement, the stream with high priority is dedicated to the standard signal, the stream with medium priority is dedicated to the HD complement, and the stream with low priority is dedicated to the 3D complement.

* * * * *